United States Patent
Schumacher et al.

(10) Patent No.: US 11,952,073 B2
(45) Date of Patent: Apr. 9, 2024

(54) ELECTRONIC DEVICE BASED VEHICLE PERFORMANCE INSTRUMENT, SYSTEM, AND METHOD

(71) Applicants: Mark Stephen Schumacher, Minneapolis, MN (US); Michael Peter Schumacher, Minneapolis, MN (US); Jane Mitchel Schumacher, Minneapolis, MN (US)

(72) Inventors: Mark Stephen Schumacher, Minneapolis, MN (US); Michael Peter Schumacher, Minneapolis, MN (US); Jane Mitchel Schumacher, Minneapolis, MN (US)

(73) Assignee: RideZeit LLC, Minneapolis, MN (US)

( * ) Notice: Subject to any disclaimer, the term of this patent is extended or adjusted under 35 U.S.C. 154(b) by 321 days.

(21) Appl. No.: 17/446,766

(22) Filed: Sep. 2, 2021

(65) Prior Publication Data
US 2022/0073167 A1 Mar. 10, 2022

Related U.S. Application Data

(60) Provisional application No. 62/706,710, filed on Sep. 4, 2020.

(51) Int. Cl.
*B62K 17/00* (2006.01)
*H04J 3/06* (2006.01)

(52) U.S. Cl.
CPC ............ *B62K 17/00* (2013.01); *H04J 3/0679* (2013.01); *H04J 3/0697* (2013.01)

(58) Field of Classification Search
CPC ...... B62K 17/00; H04J 3/0679; H04J 3/0697; B62J 50/22
See application file for complete search history.

(56) References Cited

U.S. PATENT DOCUMENTS

| | | |
|---|---|---|
| 3,626,410 A * | 12/1971 | deKoster .............. G02F 1/1506 359/228 |
| 6,963,818 B2 | 11/2005 | Flentov et al. |
| 7,940,604 B2 | 5/2011 | Inoue et al. |
| 9,449,409 B2 | 9/2016 | Roberts et al. |
| 9,521,245 B2 | 12/2016 | Yang |
| 9,641,991 B2 | 5/2017 | Pitis |
| 9,936,912 B2 | 4/2018 | Roovers et al. |
| 10,083,018 B1 * | 9/2018 | Rizea ..................... H04B 1/385 |
| 10,195,901 B2 | 2/2019 | Briggs et al. |
| 10,228,662 B2 | 3/2019 | Morohoshi et al. |
| 10,327,674 B2 | 6/2019 | Hong et al. |
| 10,564,002 B2 | 2/2020 | Hoffman et al. |
| 10,699,594 B2 | 6/2020 | Mermel et al. |
| 10,716,192 B1 * | 7/2020 | Tsibulevskiy ......... H02J 7/0049 |
| 11,394,247 B1 * | 7/2022 | Tsibulevskiy ............ H02J 7/06 |

(Continued)

*Primary Examiner* — Hongmin Fan
(74) *Attorney, Agent, or Firm* — Dunlap Bennett & Ludwig, PLLC

(57) ABSTRACT

A performance instrument for a vehicle wherein an electronic device receives one or more operational quantities from internal sensors and/or external sensors and represents the one or more operational quantities as an analog clock face so that each clock hand is a function of one of the one or more operational quantities. The analog clock face representation provides at-a-glance apparency of the operational quantities for a user of the vehicle.

14 Claims, 3 Drawing Sheets

(56) References Cited

U.S. PATENT DOCUMENTS

| | | | |
|---|---|---|---|
| 2008/0030376 A1* | 2/2008 | Tunnell | G07C 5/085 |
| | | | 340/988 |
| 2014/0293755 A1 | 10/2014 | Geiser et al. | |
| 2015/0042491 A1* | 2/2015 | Burnison | B60Q 9/008 |
| | | | 340/902 |
| 2015/0183478 A1 | 7/2015 | Tate et al. | |
| 2018/0099718 A1* | 4/2018 | Bleecker | B60K 37/02 |
| 2018/0101142 A1* | 4/2018 | Dudhat | G04G 9/0064 |
| 2019/0038938 A1 | 2/2019 | Nagasaka et al. | |
| 2019/0275372 A1 | 9/2019 | Kaji et al. | |

* cited by examiner

| Clock Function | Bike Instrument Function |
|---|---|
| Clock face indicates minutes/seconds/hours | Face indicates speed/average speed/distance/elapsed time |
| Minute hand (longest hand) | Real Time speed |
| Second hand (thinner than second hand) | Average speed, elapsed time, power, heart rate, direction |
| Hour hand (shortest hand) | Distance traveled |
| Gap between minute & second hand | Shows gap between speed and average speed |
| Rotating bezel shows target time | Rotation bezel shows target speed or distance |
| Watch crown-sets/resets time | Crown sets/resets instrument functions |
| Chronograph elapsed time (small face) | Ride elapsed time |

Mapping from Watch convention to Bike instrument use.

FIG. 4

ELECTRONIC DEVICE BASED VEHICLE PERFORMANCE INSTRUMENT, SYSTEM, AND METHOD

CROSS-REFERENCE TO RELATED APPLICATION

This application claims the benefit of priority of U.S. provisional application No. 62/706,710, filed 4 Sep. 2020, the contents of which are herein incorporated by reference.

BACKGROUND OF THE INVENTION

The present invention relates to smart devices, and more particularly, to an electronic device performance instrument, system, and method, for a motorized or nonmotorized vehicle such as a bicycle or the like.

Bicycle riding for pleasure and fitness is one of the most popular activities in the world. While many riders are content to ride with no need for information regarding basic parameters such as speed and distance, other riders want this information. Many bike computers are available for this purpose. Almost all of them feature a digital screen to indicate the measured parameters, and many of them are quite complex. A survey of the available products indicates an opportunity for a bike instrument that provides basic ride information in a familiar, easy to understand format. Also, the available products do not address the bike owner/riders desire for an instrument that is both functional and stylish.

There are many bike computer products on the market. Some are smart phone resident apps that use the smart phone display capabilities to provide moving maps and other graphic intense displays in addition to showing parameters such as speed and distance as digital information. Others are purpose-built bike computers, the simplest provide ride parameters in digital form.

There does exist one company, Omata, that displays speed and distance, elevation and elapsed time in a clock-like format, but this is a purpose-built bike instrument, not a smart device resident app as described in this disclosure. Also, the Omata unit does not utilize the full complement of watch hands. All other available bike instruments provide ride information in a limited manner, in simple digital format, or complex map-like graphics. All other available bike instruments are either too simple, or too complex for the casual rider, and do not allow customization that allows the user to personalize the instrument to the user's style while maintaining a base familiar interface.

There is an unmet need for a bike instrument that is functional, simple, familiar as to its look and feel, and stylish, which provides new aspects and methods related to its functionality.

Furthermore, no available bike computer uses the familiar three arms on the same axis/watch face convention of a clock or watch. There is a further unmet need for use of this basic watch architecture in a new way which may make the instrument instantly familiar to the user and may create a new market based upon the enormous variety of display options that may be developed.

In addition, there is an unmet need for such an instrument or system for users of motorized and nonmotorized vehicles.

SUMMARY OF THE INVENTION

In one aspect of the present invention, an electronic device for a vehicle includes a display device; one or more processors; and memory storing one or more programs configured to be executed by the one or more processors, the one or more programs including instructions for: displaying, via the display device, a clock-like face including a plurality of clock type hands; detecting a sequence of one or more inputs corresponding to one or more operational quantities of the vehicle; and in response to detecting the sequence of one or more inputs corresponding to the one or more operational quantities of the vehicle, displaying, via the display device, each of plurality of clock type hands as a function of a different operational quantity of the one or more operational quantities, respectively.

In another aspect of the present invention, the above-mentioned electronic device includes wherein the plurality of clock hands is displayed sharing an axis, wherein the plurality of clock hands includes a first clock hand, a second clock hand, and a third clock hand; further including a complication module operatively associated with the electronic device, wherein the complication module selectively sets a mapping of the one or more operational quantities to the plurality of clock hands; further including an input mechanism operatively associated with the electronic device; and in response to detecting the sequence of one or more inputs corresponding to the input mechanism, displaying, via the display device, the complication module resets the mapping of the one or more operational quantities to the plurality of clock hands; further including displaying, via the display device, a main dial and a subjacent dial, wherein each dial has a plurality of markings indicative of a plurality of values associated with the one or more operational quantities, wherein one or more inputs corresponding to the one or more operational quantities of the vehicle includes an instantaneous velocity of the vehicle; determining an average velocity from said instantaneous velocity; and in response to detecting the sequence of one or more inputs corresponding to an instantaneous velocity of the vehicle, displaying, via the display device, the first clock hand at said instantaneous velocity and the second clock had at said average velocity, wherein a transitional area between the first clock hand and the second clock hand indicates a difference between said instantaneous velocity and said average velocity, wherein the third clock hand represents one of the one or more operational qualities of the vehicle comprising an elapsed time since detecting one or more inputs corresponding to the input mechanism, or wherein the third clock hand represents one of the one or more operational qualities of the vehicle comprising a direction of the vehicle, or wherein the third clock hand represents one of the one or more operational qualities of the vehicle comprising, for example, the heart rate of a user of the vehicle.

In yet another aspect of the present invention, a method of displaying one more operational quantities of a vehicle includes the following: at an electronic device with a display device: displaying, via the display device, a clock face including a plurality of clock hands; detecting a sequence of one or more inputs corresponding to one or more operational quantities of the vehicle; and in response to detecting the sequence of one or more inputs corresponding to one or more operational quantities of the vehicle, displaying, via the display device, each clock hand as a function of a different operational quantity of the one or more operational quantities, respectively.

In yet another aspect of the present invention, the above-mentioned method further includes displaying, via the display device, an axis along the clock face. wherein the plurality of clock hands is displayed sharing said axis, wherein the plurality of clock hands includes a first clock hand, a second clock hand, and a third clock hand; further including a complication module operatively associated with the electronic device, wherein the complication module selectively sets a mapping of the one or more operational quantities to the plurality of clock hands; further including an input mechanism operatively associated with the electronic device; and in response to detecting the sequence of one or more inputs corresponding to the input mechanism, displaying, via the display device, the complication module resets the mapping of the one or more operational quantities to the plurality of clock hands; further including displaying, via the display device, a main dial and a subjacent dial, wherein each dial has a plurality of markings indicative of a plurality of values associated with the one or more operational quantities, wherein one or more inputs corresponding to one or more operational quantities of the vehicle includes an instantaneous velocity of the vehicle; determining an average velocity from said instantaneous velocity; and in response to detecting the sequence of one or more inputs corresponding to an instantaneous velocity of the vehicle, displaying, via the display device, the first clock hand at said instantaneous velocity and the second clock had at said average velocity, wherein a transitional area between the first clock hand and the second clock hand indicates a difference between said instantaneous velocity and said average velocity, wherein the third clock hand represents one of the one or more operational qualities of the vehicle comprising an elapsed time since detecting one or more inputs corresponding to the input mechanism, or wherein the third clock hand represents one of the one or more operational qualities of the vehicle comprising a direction of the vehicle, or wherein the third clock hand represents one of the one or more operational qualities of the vehicle comprising a heart rate of a user of the vehicle or distance traveled.

These and other features, aspects and advantages of the present invention will become better understood with reference to the following drawings, description and claims.

BRIEF DESCRIPTION OF THE DRAWINGS

FIG. 4 is a chart of an exemplary embodiment of a mapping module of the present invention.

DETAILED DESCRIPTION OF THE INVENTION

Figure 1:
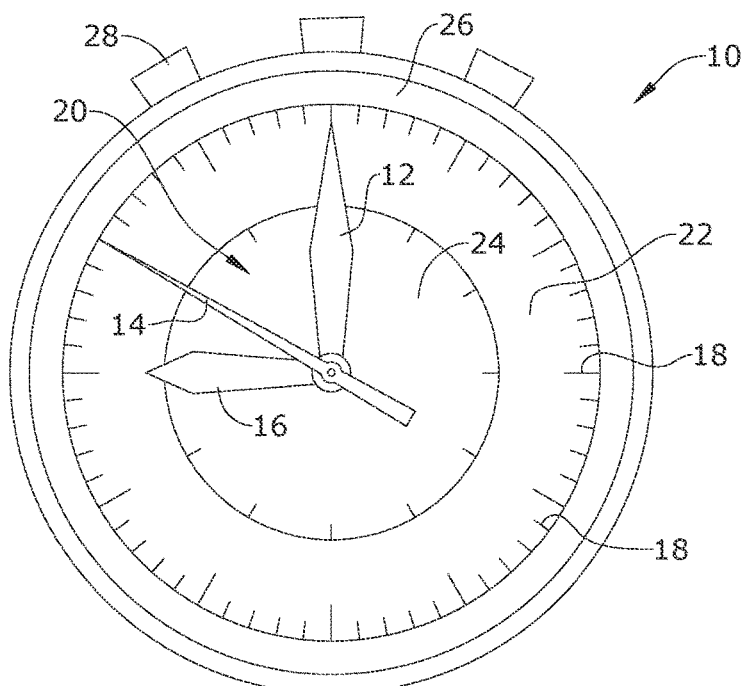
FIG. 1 is a detailed schematic view of an exemplary embodiment of the present invention.
Figure 2:
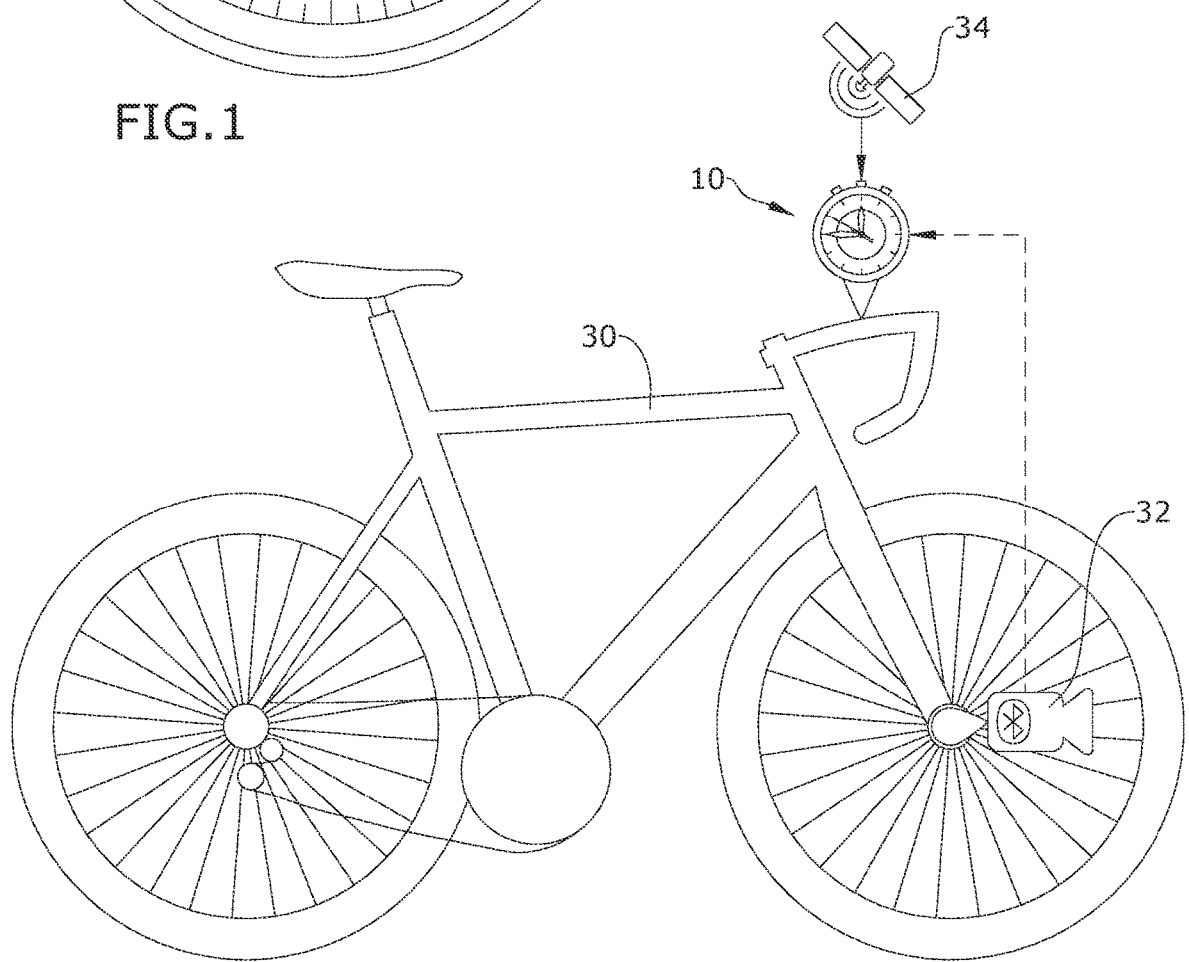
FIG. 2 is a schematic view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an electronic device performance instrument for a bicycle or the like. In one aspect the present invention may provide a electronic-device based performance instrument, system and method for users of a motorized or nonmotorized vehicle, such as, for example without limitation, bicycle, electric bike, skateboard, scooter, moped, or motorcycle.

Accordingly, in one aspect, the present invention may repurpose a smart device, such as, for example without limitation, an iWatch™ from Apple™, a Wear OS based watch, or a smart phone, for use as a performance instrument that indicates speed, average speed, distance traveled, and elapsed ride time using the hands and face convention found on analog watches.

In another aspect, the present invention may utilize smart device capability to put forward a new "complication" that uses the familiar watch attributes in a unique and compelling manner. The term "complication" in this regard is borrowed from clock/watch terminology and is used to define a watch capability that presents information to the user. This approach presents the bike rider with ride information in a familiar, intuitive graphic format. In addition, this approach opens the possibility of developing the bike instrument as a fashion accessory with an enormous variation of possible displays, much as the watch industry has developed.

The electronic device instrument of the present invention may include at least one computer with a user interface. The computer may include at least one processing unit coupled to a form of memory. The computer may include, but not limited to, a microprocessor, a server, a desktop, laptop, and smart device, such as, a tablet and smart phone, a smart watch, a smart GPS device. The computer may include a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The ordered combination of various ad hoc and automated tasks in the presently disclosed platform necessarily achieves technological improvements through the specific processes described more in detail below. In addition, the unconventional and unique aspects of these specific automation processes represent a sharp contrast to merely providing a well-known or routine environment for performing a manual or mental task.

Referring now to FIGS. 1 through 4, the present invention may comprise a electronic-device based performance instrument which may be used with a bicycle or other nonmotorized or motorized vehicle. The device will primarily be described in a nonlimiting manner for use with a bike or bicycle.

In an exemplary embodiment, the present invention may comprise a combination instrument that provides speed, distance, average speed, difference between speed and average speed, and/or elapsed time to a bicycle rider using the familiar attributes of an analog clock. This is accomplished by using mapping from watch convention to bike instrument use, as shown at FIG. 4. The clock functions may be replaced with bike instrument functions. These parameters are exemplary, and any parameters or bike functions may be associated with each clock function in accordance with the present invention.

A data acquisition system may be involved in automatically obtaining data from one or more sensors or transducers directly into the computing system (electronic device), wherein a sensor is any device that responds to a physical change and outputs an electrical signal and wherein a transducer is any device that converts energy from one form to another. The data acquisition system may include digital/analog converters and other necessary hardware. Bluetooth wireless transmitters can connect with smart phones or tablets to log and monitor and record measurements, turning mobile devices into portable data acquisition systems. These transmitters measure different sensor inputs, wherein the data transmission is performed via Bluetooth wireless technology to a smart phone or tablet with the software application installed. The software application may allow the smart phone to pair and set up multiple transmitters.

In an exemplary embodiment of the present invention, various clock functions may be re-purposed to accommodate the functions of a bike instrument for display via a software application. For example, without limitation: The clock face which may indicate the clock function of minutes/seconds/hours may be re-purposed via the application to provide an indication of speed/average speed/distance/elapsed time. The clock minute hand or first clock hand 12 may be re-purposed via the application to provide an indication of real time speed. The clock second hand or second clock hand 14 may be re-purposed via the application to provide an indication of a parameter such as, for example without limitation, average speed, elapsed time, power, heart rate, direction, or the like. The clock hour hand of third clock hand 16 may be re-purposed via the application to provide an indication of distance traveled. The clock gap between minute and second hand or a transitional area 20 between the first clock hand 12 and the second clock hand 14 may be re-purposed via the application to show the difference between speed and average speed. The watch crown 28 which sets/resets time may be repurposed via the application to provide a crown which sets/resets instrument functions. The watch chronograph elapsed time (small face) or sub dial 24 may be re-purposed via the application to provide an indication of ride elapsed time.

When riding for exercise, average speed is an important measurement. The proposed instrument may tell the rider if real time speed is above or below the average speed by looking at the transitional area 20 between the first clock hand 12 and the second clock hand 14 described above.

In order to map the clock functions over to be used as a bike instrument, a smart watch resident piece of software is required. This piece of software is called an application. In a watch, any function that is different than basic time is called a "complication". Common examples of "complications" may include date function, moon phase, chronograph, split second, or the like. The word "complications" comes from mechanical watches but may be used in this situation to describe the software that may be used to re-purpose the time functions to bike instrument functions. Smart watches are designed to take in measurements from internal and/or external sensors. Nonlimiting examples of sensors may include heart rate monitor, GPS, barometric pressure, glucose, or the like. In the case of the bike instrument, examples of inputs may include but not be limited to a wheel speed/cadence sensor input or a GPS input. These sensor inputs may be used to calculate speed, distance, average speed, elapsed time and may then be coupled or operably connected by software in accordance with the present invention, to the appropriate watch hand. The re-purposed hands, together with a face designed for the bike instrument purpose may be used in combination to effectively re-purpose a smart watch as a bike instrument. According to the present invention a key feature of this approach may include that any analog watch that allows software coupling to the hands may be re-purposed as a bike instrument. This in turn may open a new market for makers of such watches. The hands/face may be designed in a separate application. This may allow a very modular structure.

Figure 3:
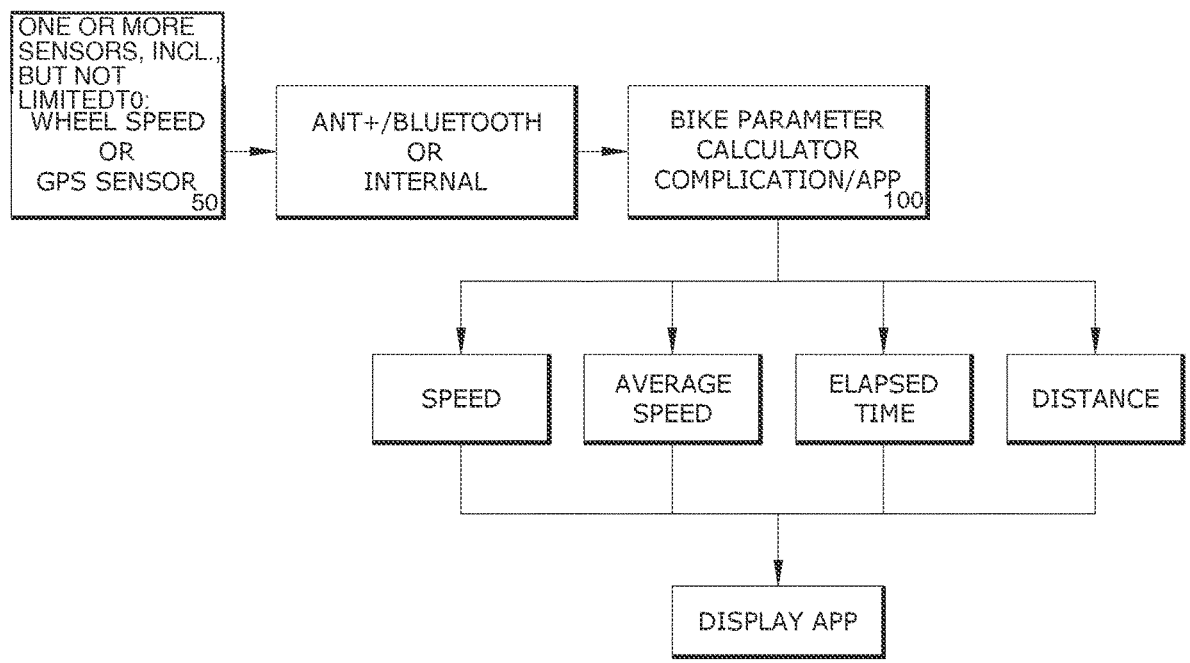
FIG. 3 is a flow chart of an exemplary embodiment of the present invention.

FIG. 3 is a block diagram of the proposed software structure or architecture in accordance with an exemplary embodiment of the invention. As shown at FIG. 3, external sensors, such as, for example without limitation wheel speed sensor or GPS sensor 34, may communicate to the software application using standard protocols such as ANT+ or Bluetooth®. Alternatively, the software application may use GPS input embedded in the watch Alternatively a available wheel sensor 32 in FIG. 2 may used to by the device software to compute ride parameters.

Analog display of information such as used with watches/clocks, gauges, car speedometers, tachometers, or the like, have proven to be a superior method of data presentation. The bike instrument application of the present invention may bring this superior data presentation format to bike instrumentation in a unique way that builds on the very familiar analog clock. A key attribute of the bike instrument of the present invention may include maintaining the familiarity of the clock hands/face dial, including a bezel 26 and the like.

Further, as has been proven in the watch market, this method of display lends itself to an enormous variety of style and design permutations to suit individual tastes. The bike instruments available today ignore this possibility.

FIG. 1 shows an instrument 10 in accordance with an exemplary embodiment of the present invention comprising an application display dial 22, and wherein the instrument is shown mounted on a bicycle handlebar mounting bracket. FIG. 4 is a representation of a possible version of a finished product in accordance with the present invention.

In an exemplary embodiment of the present invention, a smart device-based bicycle performance system instrument 10 may comprise one or more of the following elements or components, and combinations thereof.

1. Smart device
2. Mapping from watch convention to bike instrument
3. Operating software
4. One or more sensors
5. Bike instrument using watch convention The mapping from watch convention to bike instrument may be any mapping that is suitable. In some embodiments, the mapping from watch convention to bike instrument may be as shown at FIG. 4.

In some embodiments, the operating software may comprise the software structure as set forth in the block diagram of FIG. 3.

The system may be incorporated in any suitable instrument. In some embodiments, the system may be incorporated in an instrument as shown at FIG. 1 showing use of an inventive watch convention in accordance with the present invention.

In an exemplary embodiment, the present invention may comprise a smart device resident (watch or phone) software application that uses sensor inputs operatively associated with one or more timers for providing synchronous and/or asynchronous time inputs to calculate real time parameters of speed, average speed distance traveled and elapsed time.

In an exemplary embodiment, the display elements may relate to the following parameters or ride metrics. These, however, are nonlimiting examples, as any hand may be used to represent any ride metric.

The outside numbers or markers 18 on the display face 22 may represent miles per hour. The "minute hand" or first clock hand 12 may indicate speed. Note the zero MPH position may be placed like a speedometer, at the 9 o'clock watch position or twelve o'clock position.

The "second hand" or second clock hand 14 may indicate average speed. The transitional area 20 between the average speed hand and the speed hand provide valuable feedback to a rider. By constantly striving to keep speed above average speed, a maximum workout may be achieved. Alternatively, the second clock hand 14 may be used to display ride elapsed time.

The inside numbers/markers may represent miles traveled.

The "hour hand" or third clock hand 16 may indicate distance traveled.

In an exemplary embodiment of the present invention the software application may generate analogous watch hand movements to graphically display parameters such as speed, average speed, distance traveled, elapsed time.

In an exemplary embodiment of the present invention, the hands used to display parameters are located on same axis, analogous to a watch or a clock.

In an exemplary embodiment of the present invention, a parameter generating application may connect to a display app.

In an exemplary embodiment of the present invention, the display application may present parameters to the user on a screen display.

In an exemplary embodiment of the present invention, the display application may present speed and distance parameters using separate scales.

In an exemplary embodiment of the present invention, the display app may maintain visual distinction between speed, average speed, distance, and elapsed time hands, analogous to the minute, second and hour hand visual distinctions of a watch or a clock.

In some embodiments, the present invention may further comprise a holder or mounting means that may enable a wristwatch to be mounted to the vehicle 30, such as the handlebars of a bike, providing easy visibility to the bike instrument, without the watch wrist strap.

In some embodiments, the holder may incorporate a Fresnel lens to enlarge the watch display for enhanced instrument visibility.

In an exemplary embodiment of the present invention, the elements or components may interrelate in the following manner. FIG. 3 shows a block diagram of an exemplary software structure. The software may compute bike ride parameters and present them to a watch face maintaining watch convention familiarity. The software application may also use GPS input and/or input from one or more sensors internal to the smart device. An exemplary instrument and instrument face are seen at FIG. 1.

In an exemplary embodiment of the present invention, an electronic-device based system may comprise the following elements and combinations thereof. The system may comprise software as shown at FIG. 3 (a block diagram of software in accordance with the present invention) used to execute mapping and display. The system may comprise one or more sensors, which may be used by the software application. The system may comprise an instrument with a watch-like display, as shown at FIG. 1, which shows an example of a possible version of a finished product in accordance with an exemplary embodiment of the present invention.

The present invention may include a display controller, a mapping module, and a complication module as part of the bike parameter calculator and complication/app 100, schematically illustrated in FIG. 3, The display controller and the complication module is configured to map data associated the one or more sensors 50 and GPS 34 in accordance with software application and user instructions.

Preserving the watch-like convention may be a key element as this makes the graphic interface familiar, intuitive and provides enormous customization possibilities.

In an exemplary embodiment, the present invention may be made by developing a developing a smart device (smart watch or the like) resident application capable of computing ride parameters discussed herein. The application may in turn, drive another application which may display the parameters in a watch-like convention. As noted herein, FIG. 4 illustrates exemplary mapping via a mapping module of a watch convention to a bike instrument in accordance with the present invention. This mapping element may be essential as it may enable the bike (or other motorized or nonmotorized vehicle) instrument to provide ride parameters (speed, distance, average speed, or the like) in a format which is familiar and intuitive, and is further enormously customizable.

In some embodiments, a variety of ride parameters may be optionally displayed using the watch convention. For example, without limitation, the "second hand" or second clock hand 14 may be used to display a parameter such as ride average speed, or elapsed time, or rider power output (calculated) or heart rate or be used to point to a direction to take (turn right/left, for example).

In an exemplary embodiment, the present invention may provide a method of use which may comprise one or more of the following components or steps and combinations thereof. In order to use the application, a user may download the application into a device such as, for example without limitation, a smart watch. The user may then configure the app to a parameter associated with a nonmotorized or motorized vehicle such as a bicycle (input wheel diameter, for example). The instrument 10 may be worn by the user or mounted for easy display in any manner by any suitable mounting means, such as, for example without limitation, on a bicycle handlebar or the like. With the smart watch in ride mode, the ride parameters may be displayed on the face using the selected display.

In summary, an exemplary embodiment of the present invention may provide a smart device (for example a smart watch) based application that may use a watch face and hands convention to display bike ride parameters, and may provide ride information in an intuitive, familiar, graphic format that allows an enormous range of customization of the interface while still being familiar. The present invention may provide a simple, intuitive, graphical reading of bike ride parameters such as speed, distance, average speed in a familiar format.

The computer-based data processing system and method described above is for purposes of example only and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. An electronic device for a vehicle, the electronic device comprising:
    a display device;
    one or more processors; and
    memory storing one or more programs configured to be executed by the one or more processors, the one or more programs including instructions for:
        displaying, via the display device, a clock face including a plurality of clock hands;
        detecting a sequence of one or more inputs corresponding to one or more operational quantities of the vehicle;
        in response to detecting the sequence of one or more inputs corresponding to the one or more operational quantities of the vehicle, displaying, via the display device, each of plurality of clock-like hands as a function of a different operational quantity of the one or more operational quantities, respectively, wherein the plurality of clock-like hands is displayed sharing an axis, and wherein the plurality of clock-like hands includes a first clock hand, a second clock hand, and a third clock hand; and
        a complication module operatively associated with the electronic device, wherein the complication module selectively sets a mapping of the one or more operational quantities to the plurality of clock hands.

2. The electronic device of claim 1, further including an input mechanism operatively associated with the electronic device; and
    in response to detecting the sequence of one or more inputs corresponding to the input mechanism, displaying, via the display device, the complication module resets the mapping of the one or more operational quantities to the plurality of clock hands.

3. The electronic device of claim 2, further including displaying, via the display device, a main dial and a subjacent dial, wherein each dial has a plurality of markings indicative of a plurality of values associated with the one or more operational quantities.

4. The electronic device of claim 3, wherein one or more inputs corresponding to the one or more operational quantities of the vehicle includes an instantaneous velocity of the vehicle;
    determining an average velocity from said instantaneous velocity; and
    in response to detecting the sequence of one or more inputs corresponding to an instantaneous velocity of the vehicle, displaying, via the display device, the first clock hand at said instantaneous velocity and the second clock had at said average velocity, wherein a transitional area between the first clock hand and the second clock hand indicates a difference between said instantaneous velocity and said average velocity.

5. The electronic device of claim 4, wherein the third clock hand represents one of the one or more operational qualities of the vehicle comprising an elapsed time since detecting one or more inputs corresponding to the input mechanism.

6. The electronic device of claim 4, wherein the third clock hand represents one of the one or more operational qualities of the vehicle comprising a direction of the vehicle.

7. The electronic device of claim 4, wherein the third clock hand represents one of the one or more operational qualities of the vehicle comprising a heart rate of a user of the vehicle.

8. A method of displaying one or more operational quantities of a vehicle, the method comprising:
    at an electronic device with a display device:
        displaying, via the display device, a clock face including a plurality of clock hands;
        detecting a sequence of one or more inputs corresponding to one or more operational quantities of the vehicle;
        in response to detecting the sequence of one or more inputs corresponding to one or more operational quantities of the vehicle, displaying, via the display device, each clock hand as a function of a different operational quantity of the one or more operational quantities, respectively;
        displaying, via the display device, an axis along the clock face, wherein the plurality of clock hands is displayed sharing said axis, wherein the plurality of clock hands includes a first clock hand, a second clock hand, and a third clock hand; and;
        providing a complication module operatively associated with the electronic device, wherein the complication module selectively sets a mapping of the one or more operational quantities to the plurality of clock hands.

9. The method of claim 8, further including an input mechanism operatively associated with the electronic device; and
    in response to detecting the sequence of one or more inputs corresponding to the input mechanism, displaying, via the display device, the complication module resets the mapping of the one or more operational quantities to the plurality of clock hands.

10. The method of claim 9, further including displaying, via the display device, a main dial and a subjacent dial, wherein each dial has a plurality of markings indicative of a plurality of values associated with the one or more operational quantities.

11. The method of claim 10, wherein one or more inputs corresponding to one or more operational quantities of the vehicle includes an instantaneous velocity of the vehicle;
    determining an average velocity from said instantaneous velocity; and
    in response to detecting the sequence of one or more inputs corresponding to an instantaneous velocity of the vehicle, displaying, via the display device, the first clock hand at said instantaneous velocity and the second clock had at said average velocity, wherein a transitional area between the first clock hand and the second clock hand indicates a difference between said instantaneous velocity and said average velocity.

12. The method of claim 11, wherein the third clock hand represents one of the one or more operational qualities of the vehicle comprising an elapsed time since detecting one or more inputs corresponding to the input mechanism.

13. The method of claim 11, wherein the third clock hand represents one of the one or more operational qualities of the vehicle comprising a direction of the vehicle.

14. The method of claim 11, wherein the third clock hand represents one of the one or more operational qualities of the vehicle comprising a heart rate of a user of the vehicle.

* * * * *